US012531343B2

(12) United States Patent
Hashimoto

(10) Patent No.: US 12,531,343 B2
(45) Date of Patent: Jan. 20, 2026

(54) ANTENNA DEVICE AND METHOD FOR MANUFACTURING THE SAME

(71) Applicant: KABUSHIKI KAISHA TOSHIBA, Tokyo (JP)

(72) Inventor: Koh Hashimoto, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 184 days.

(21) Appl. No.: 18/429,183

(22) Filed: Jan. 31, 2024

(65) Prior Publication Data

US 2025/0046998 A1 Feb. 6, 2025

(30) Foreign Application Priority Data

Jul. 31, 2023 (JP) ................................ 2023-124491

(51) Int. Cl.
*H01Q 9/04* (2006.01)
*H01Q 1/22* (2006.01)
*H01Q 1/38* (2006.01)
*H01Q 1/42* (2006.01)

(52) U.S. Cl.
CPC ......... *H01Q 9/0407* (2013.01); *H01Q 1/2283* (2013.01); *H01Q 1/38* (2013.01); *H01Q 1/422* (2013.01)

(58) Field of Classification Search
CPC ...... H01Q 9/0407; H01Q 1/2283; H01Q 1/38; H01Q 1/422; H01Q 9/0457
See application file for complete search history.

(56) References Cited

U.S. PATENT DOCUMENTS 9,044,820 B2 * 6/2015 Johnson ............... B65G 33/265
2017/0054217 A1 * 2/2017 Hashimoto .......... H01Q 9/0457
2021/0098882 A1 * 4/2021 Paulotto ................ H01Q 1/243

FOREIGN PATENT DOCUMENTS

JP 2017041790 A 2/2017
JP 6517629 B2 5/2019

* cited by examiner

*Primary Examiner* — David E Lotter
(74) *Attorney, Agent, or Firm* — Holtz, Holtz & Volek PC

(57) ABSTRACT

According to one embodiment, an antenna device includes a first structure, a second structure, a third structure, a signal line, a first resin member, and a first intermediate member. The first structure includes a first insulating member, a first conductive layer, and a first connecting conductive member that pierces the first insulating member along a first direction and includes a first cylindrical portion along the first direction. The second structure includes a second insulating member, a second conductive layer, and a second connecting conductive member that pierces the second insulating member along the first direction. The signal line is provided between the second insulating member and the first insulating member. The third structure includes a third insulating member and a third conductive layer. The first intermediate member is provided between the first structure and the third structure, and in contact with the first structure and the third structure.

20 Claims, 4 Drawing Sheets

ANTENNA DEVICE AND METHOD FOR MANUFACTURING THE SAME

CROSS-REFERENCE TO RELATED APPLICATIONS

This application is based upon and claims the benefit of priority from Japanese Patent Application No. 2023-124491, filed on Jul. 31, 2023; the entire contents of which are incorporated herein by reference.

FIELD

Embodiments described herein relate generally to an antenna device and a method for manufacturing the same.

BACKGROUND

For example, it is desired to improve the characteristics of an antenna device.

DETAILED DESCRIPTION

Figure 1:
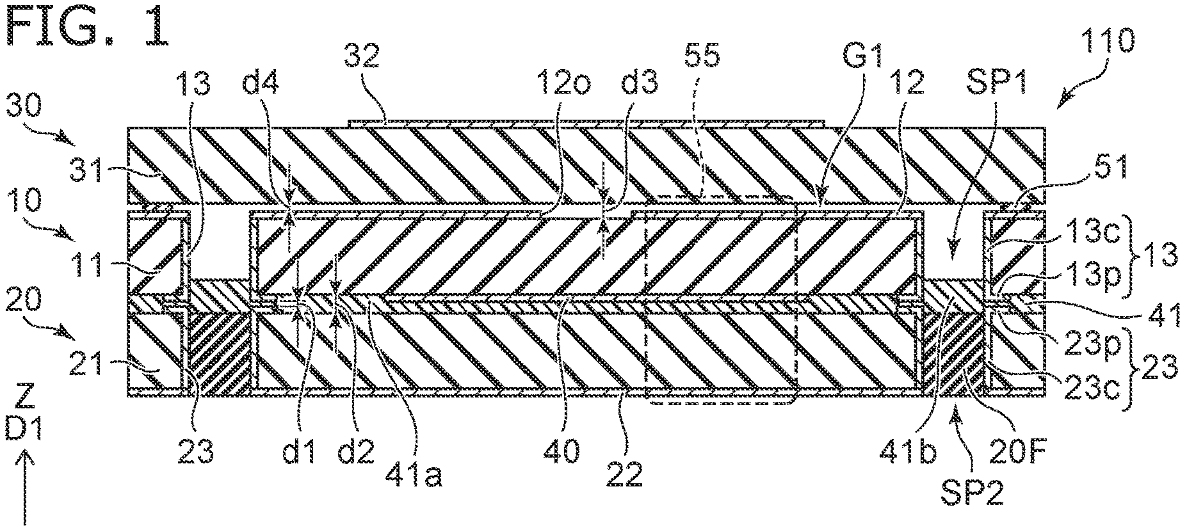
FIG. 1 is a schematic cross-sectional view illustrating an antenna device according to a first embodiment.

According to one embodiment, an antenna device includes a first structure, a second structure, a third structure, a signal line, a first resin member, and a first intermediate member. The first structure includes a first insulating member, a first conductive layer, and a first connecting conductive member. The first connecting conductive member pierces the first insulating member along a first direction. The first connecting conductive member includes a first cylindrical portion along the first direction. The first connecting conductive member is electrically connected to the first conductive layer. The second structure includes a second insulating member, a second conductive layer, and a second connecting conductive member. The second connecting conductive member pierces the second insulating member along the first direction. The second connecting conductive member is electrically connected to the second conductive layer. At least a part of the second insulating member is provided between the second conductive layer and the first conductive layer. At least a part of the first insulating member is provided between the second insulating member and the first conductive layer. The signal line is provided between the second insulating member and the first insulating member. The first resin member includes a first resin region and a second resin region. The first resin region is provided between the first structure and the second structure. The second resin region is provided in at least a part of a first space in the first cylindrical portion. The third structure includes a third insulating member and a third conductive layer. The first structure is provided between the second structure and the third structure in the first direction. A first gap is provided between the first structure and the third structure. The first intermediate member is provided between the first structure and the third structure, and in contact with the first structure and the third structure.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating an antenna device according to a first embodiment.

Figure 2:
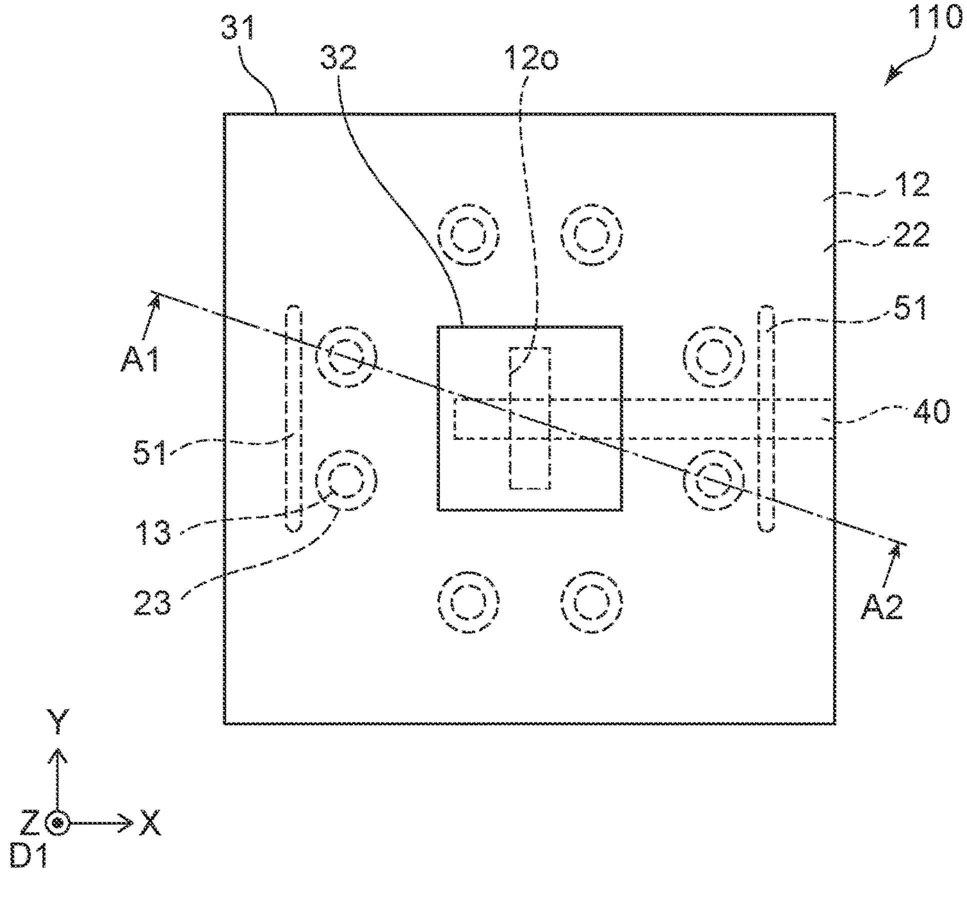
FIG. 2 is a schematic plan view illustrating the antenna device according to the first embodiment.

FIG. 2 is a schematic plan view illustrating the antenna device according to the first embodiment.

Figure 3:
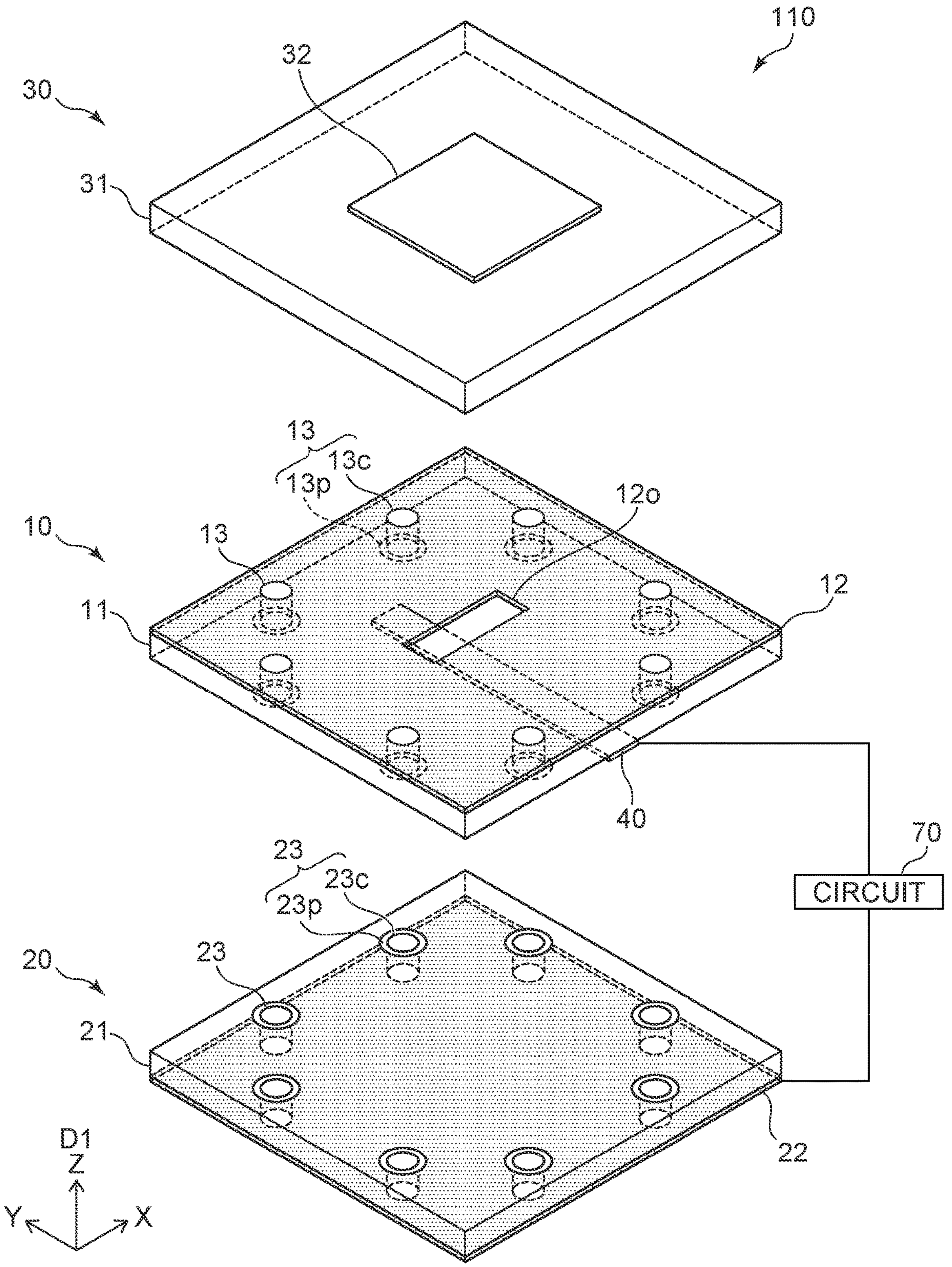
FIG. 3 is a schematic perspective view illustrating a part of the antenna device according to the first embodiment.

FIG. 3 is a schematic perspective view illustrating a part of the antenna device according to the first embodiment.

FIG. 1 is a sectional view taken along the line A1-A2 in FIG. 2.

As shown in FIGS. 1 and 3, an antenna device 110 according to the embodiment includes a first structure 10, a second structure 20, a third structure 30, a signal line 40, a first resin member 41, and a first intermediate member 51. In FIG. 3, these structures are shown separated from each other.

The first structure 10 includes a first insulating member 11, a first conductive layer 12, and a first connecting conductive member 13. The first connecting conductive member 13 pierces the first insulating member 11 along a first direction D1. The first connecting conductive member 13 includes a first cylindrical portion 13*c* extending in the first direction D1. The first connecting conductive member 13 is electrically connected to the first conductive layer 12.

The second structure 20 includes a second insulating member 21, a second conductive layer 22, and a second connecting conductive member 23. The second connecting conductive member 23 pierces the second insulating member 21 along the first direction D1. The second connecting conductive member 23 is electrically connected to the second conductive layer 22.

For example, at least a part of the second insulating member 21 is provided between the second conductive layer 22 and the first conductive layer 12. At least a part of the first insulating member 11 is provided between the second insulating member 21 and the first conductive layer 12.

The signal line 40 is provided between the second insulating member 21 and the first insulating member 11. The first resin member 41 includes a first resin region 41*a* and a second resin region 41*b*. The first resin region 41*a* is provided between the first structure 10 and the second structure 20. The second resin region 41*b* is provided in at least a part of a first space SP1 in the first cylindrical portion 13*c*. The first resin region 41*a* and the second resin region 41*b* may be continuous with each other. The boundaries between these regions can be clear or undefined. For example, the first resin region 41*a* is provided between the first insulating member 11 and the second insulating member 21.

The first structure 10 is provided between the second structure 20 and the third structure 30 in the first direction D1. The third structure 30 includes a third insulating member 31 and a third conductive layer 32. As shown in FIG. 1, a first gap G1 is provided between the first structure 10 and the third structure 30.

The first intermediate member 51 is provided between the first structure 10 and the third structure 30. The first intermediate member 51 is in contact with the first structure 10 and the third structure 30.

As shown in FIG. 3, for example, the signal line 40 and the second conductive layer 22 are electrically connected to the signal circuit 70. An electrical signal is supplied from the signal circuit 70 to the signal line 40. The electrical signal is a high frequency signal. The supplied electrical signal is transmitted to the third conductive layer 32 via the signal line 40. Radio waves corresponding to the electric signal are emitted from the third conductive layer 32. The third conductive layer 32 functions, for example, as a patch antenna.

In the embodiment, the signal line 40 is provided between the first conductive layer 12 and the second conductive layer 22 in the first direction D1. These conductive layers are capacitively coupled via the first connecting conductive member 13 and the second connecting conductive member 23. Alternatively, these conductive layers may be electrically connected via the first connecting conductive member 13 and the 10 second connecting conductive member 23.

For example, the first resin member 41 is provided between the first structure 10 and the second structure 20. The first resin member 41 fixes the mutual positions of the structures. The first resin member 41 may function as, for example, an adhesive layer. For example, a resin material that will become the first resin member 41 is inserted between these structures, and pressure is applied to these structures so that they approach each other. The distance between these structures becomes the desired distance. At this time, the resin material existing between these structures can flow out into the first space SP1 in the first cylindrical portion 13*c* of the first connecting conductive member 13, for example. At this time, the first gap G1 is provided between the first structure 10 and the third structure 30. The air existing in the first space SP1 can flow out through the first gap G1.

With this configuration, the resin material that becomes the first resin member 41 can be spread thinly and uniformly between these structures. It is possible to suppress the formation of voids in the resin material in the first space SP1.

A part of the resin material that will become the first resin member 41 (second resin region 41*b*) enters the first cylindrical portion 13*c*. Thereby, the first resin member 41 being thin and uniform is obtained. For example, the distance between the first connecting conductive member 13 and the second connecting conductive member 23 can be controlled stably and with high accuracy. Capacitive coupling or electrical connection between these connecting conductive members can be stably obtained. By the stable coupling or connection, stable radio wave radiation can be obtained. According to the embodiment, it is possible to provide an antenna device with improved characteristics.

For example, when the resin member includes voids, the volume of the voids changes due to changes in temperature, etc., and the structure is likely to be distorted. In the structure, the structure and properties may become unstable. In the embodiments, voids are suppressed. Thereby, it becomes easy to obtain a stable structure and properties. For example, it becomes easier to obtain higher reliability.

As shown in FIGS. 1 and 3, for example, the first conductive layer 12 includes a slot 120. The slot 120 corresponds to, for example, an opening provided in the first conductive layer 12. At least a part of the slot 120 is located between the signal line 40 and the third conductive layer 32 in the first direction D1.

The first conductive layer 12, the signal line 40, and the second conductive layer 22 function as a stripline 55, for example. The stripline 55 corresponds to, for example, a triplate line. The stripline 55 efficiently radiates radio waves based on the supplied electrical signals.

Power is supplied to the third conductive layer 32 from the stripline 55 via the slot 120. The antenna device 110 is, for example, a slot-coupled patch antenna. In the antenna device 110, the stripline 55 serves as a feed line.

In a stripline-fed patch antenna, an unnecessary parallel plate mode occurs inside the stripline 55 (for example, in a region overlapping with the third conductive layer 32). The parallel plate mode propagates between two conductive layers included in the stripline 55. Parallel plate mode propagation causes power leakage and reduces antenna efficiency.

In the embodiment, by the first connecting conductive member 13 and the second connecting conductive member 23, current (high frequency current) can to flow between the first conductive layer 12 and the second conductive layer 22. This suppresses the parallel plate mode.

As described above, in the embodiment, the distance between the first connecting conductive member 13 and the second connecting conductive member 23 can be uniformly shortened with high accuracy. Thereby, the high frequency current can flow between the first connecting conductive member 13 and the second connecting conductive member 23 with high efficiency. Parallel plate mode can be suppressed more effectively. According to the embodiment, power leakage can be suppressed more effectively. High antenna efficiency can be obtained. An antenna device with improved characteristics can be provided.

For example, the second resin region 41*b* is provided in the first space SP1. Thereby, the contact area between the first resin member 41 and the first connecting conductive member 13 can be increased. It becomes easy to obtain high mechanical strength.

As shown in FIGS. 1 and 3, in this example, the signal line 40 is fixed to the first insulating member 11. As described below, the signal line 40 may be fixed to the second insulating member 21.

As shown in FIG. 1, a part of the first resin region 41*a* may be provided between the second connecting conductive member 23 and the first connecting conductive member 13. In this case, the second connecting conductive member 23 can be capacitively coupled to the first connecting conductive member 13.

As shown in FIGS. 1 and 3, the first connecting conductive member 13 may further include a first planar portion 13*p*. The first planar portion 13*p* overlaps the first insulating member 11 in the first direction D1. The first planar portion 13*p* is, for example, a fringe portion.

As shown in FIG. 1, the first planar portion 13*p* is provided between the first resin region 41*a* and the second resin region 41*b*. The contact area between the first planar portion 13*p* and the first resin member 41 can be increased. It becomes easy to obtain high mechanical strength.

As shown in FIGS. 1 and 3, the second connecting conductive member 23 may include a second planar portion 23*p*. The second planar portion 23*p* overlaps the second insulating member 21 in the first direction D1. The second planar portion 23*p* is, for example, a fringe portion. At least a part of the second planar portion 23*p* may face the first planar portion 13*p*. For example, the capacitance between the first connecting conductive member 13 and the second connecting conductive member 23 can be increased. More efficient binding is obtained.

As shown in FIG. 1, a distance along the first direction D1 between the first connecting conductive member 13 and the second connecting conductive member 23 is defined as a first distance d1. In one example, the first distance d1 is, for example, not less than 0.05 μm and not more than 10 μm.

As shown in FIG. 1, a distance between the first insulating member 11 and the second insulating member 21 along the first direction D1 is defined as a second distance d2. In one example, the second distance d2 is not less than 10 μm and not more than 200 μm.

As shown in FIG. 1, a distance between the first insulating member 11 and the third insulating member 31 along the first direction D1 is defined as a third distance d3. The third distance d3 is, for example, ½ or less of the wavelength of the radio wave transmitted and received by the antenna device 110. In one example, the third distance d3 is, for example, not less than 1/100 or more of the wavelength of the radio wave.

As shown in FIG. 1, a distance between the first conductive layer 12 and the third insulating member 31 along the first direction D1 is defined as a fourth distance d4. The fourth distance d4 is, for example, ½ or less of the wavelength of the radio wave transmitted and received by the antenna device 110. In one example, the fourth distance d4 is, for example, 1/100 or more of the wavelength of the radio wave.

In the embodiment, the first space SP1 is connected to the first gap G1. The air existing in the first space SP1 can flow out through the first gap G1. The generation of voids is suppressed.

As shown in FIGS. 1 and 3, the second connecting conductive member 23 may include a second cylindrical portion 23*c* extending along the first direction D1. As shown in FIG. 1, the second structure 20 may further include a filling member 20F. At least a part of the filling member 20F is provided in at least a part of a second space SP2 in the second cylindrical portion 23*c*. If the second space SP2 in the second cylindrical portion 23*c* is a gap, there is a possibility that an unintended member may enter the gap. By providing the filling member 20F in the second space SP2 in the second cylindrical portion 23*c*, the characteristics of the second cylindrical portion 23*c* are easily stabilized. The filling member 20F may be conductive or insulative.

As shown in FIG. 2, the slot 120 may have a polygonal shape. The shape of the slot 120 is arbitrary. The planar shape of the signal line 40 is arbitrary.

In the antenna device 110, the first intermediate member 51 may bond the first structure 10 and the third structure 30. The first intermediate member 51 may include, for example, a conductive material or an insulating material.

The first resin member 41 may include a resin material and a plurality of fillers. By providing the plurality of fillers, the distance between the first structure 10 and the second structure 20 can be controlled more stably. It becomes easy to obtain high mechanical strength. It becomes to obtain high thermal stability.

Figure 4:
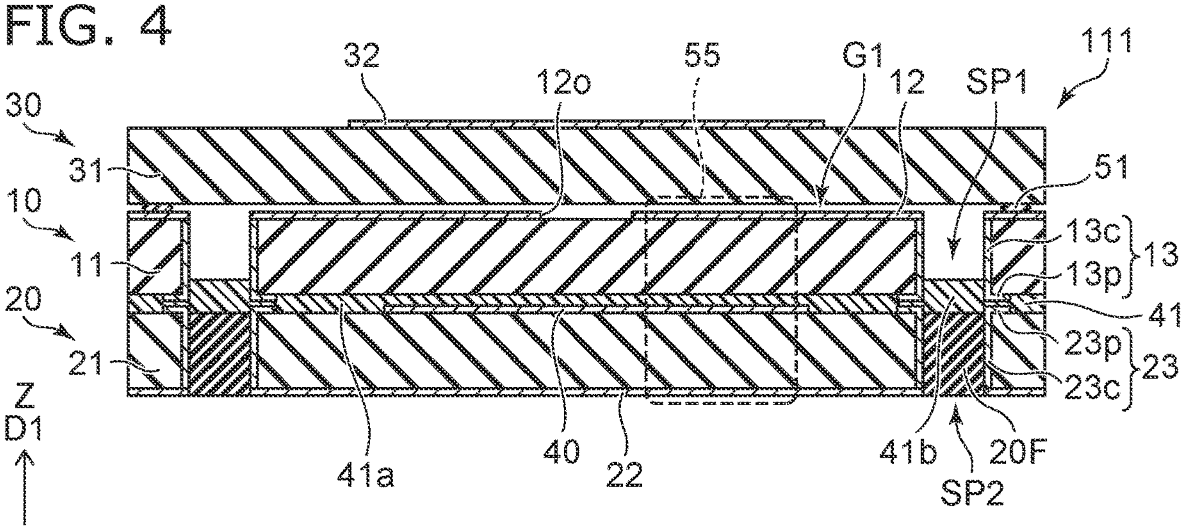
FIG. 4 is a schematic cross-sectional view illustrating an antenna device according to the first embodiment.

FIG. 4 is a schematic cross-sectional view illustrating an antenna device according to the first embodiment.

As shown in FIG. 4, in an antenna device 111 according to the embodiment, the configuration of the signal line 40 is different from the configuration of the signal line 40 in the antenna device 110. The configuration of the antenna device 111 except for this may be the same as the configuration of the antenna device 110.

In the antenna device 111, the signal line 40 is fixed to the second insulating member 21. Also in the antenna device 111, for example, capacitive coupling or electrical connection between the first connecting conductive member 13 and the second connecting conductive member 23 can be stably obtained. An antenna device with improved characteristics can be provided.

Figure 5:
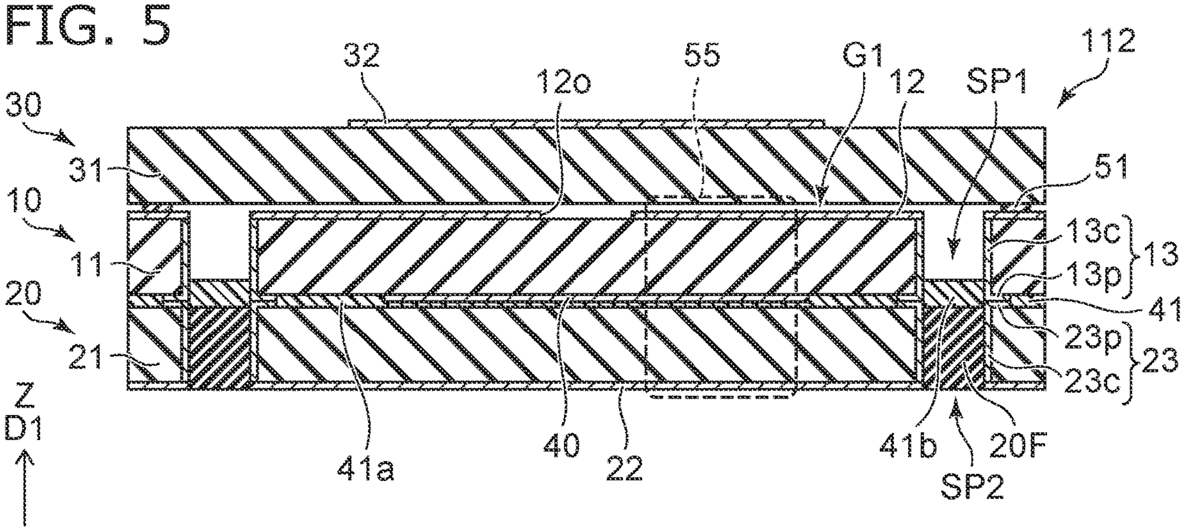
FIG. 5 is a schematic cross-sectional view illustrating an antenna device according to the first embodiment.

FIG. 5 is a schematic cross-sectional view illustrating an antenna device according to the first embodiment.

As shown in FIG. 5, in an antenna device 112 according to the embodiment, the second connecting conductive member 23 is in contact with the first connecting conductive member 13. The configuration of the antenna device 112 except for this may be the same as the configuration of the antenna device 110. Also in the antenna device 112, electrical connection between the first connecting conductive member 13 and the second connecting conductive member 23 can be stably obtained. An antenna device with improved characteristics can be provided.

In the antenna device 111 and the antenna device 112, voids and the like are also suppressed. It becomes easy to obtain stable structure and properties. It becomes easier to obtain higher reliability. Power leakage caused by parallel plate mode can be effectively suppressed. High antenna efficiency can be obtained.

Second Embodiment

The second embodiment relates to a method for manufacturing the antenna device.

Figure 6:
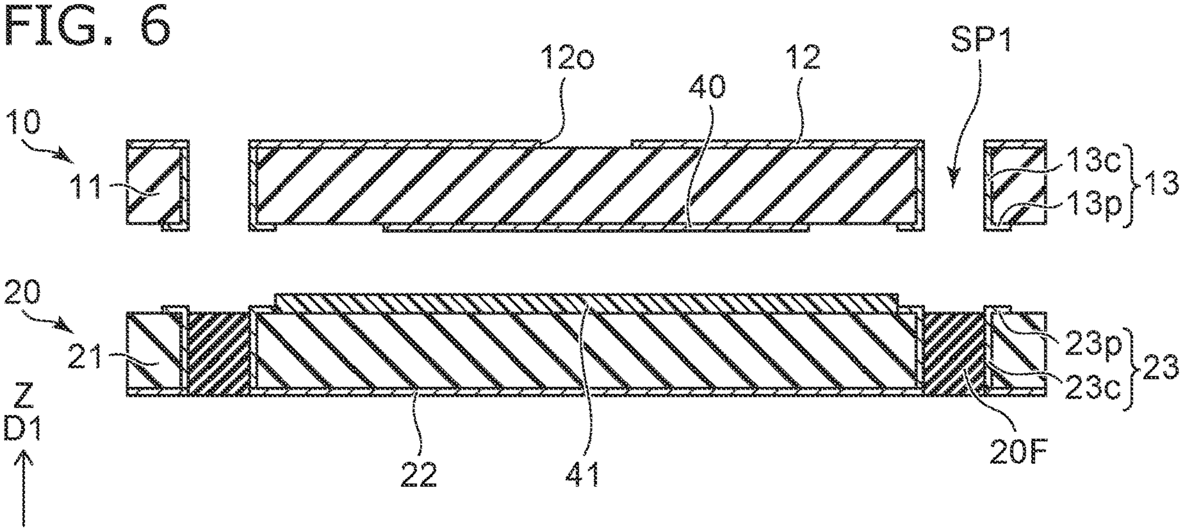
FIG. 6 is a schematic cross-sectional view illustrating the method for manufacturing the antenna device according to a second embodiment.
Figure 7:
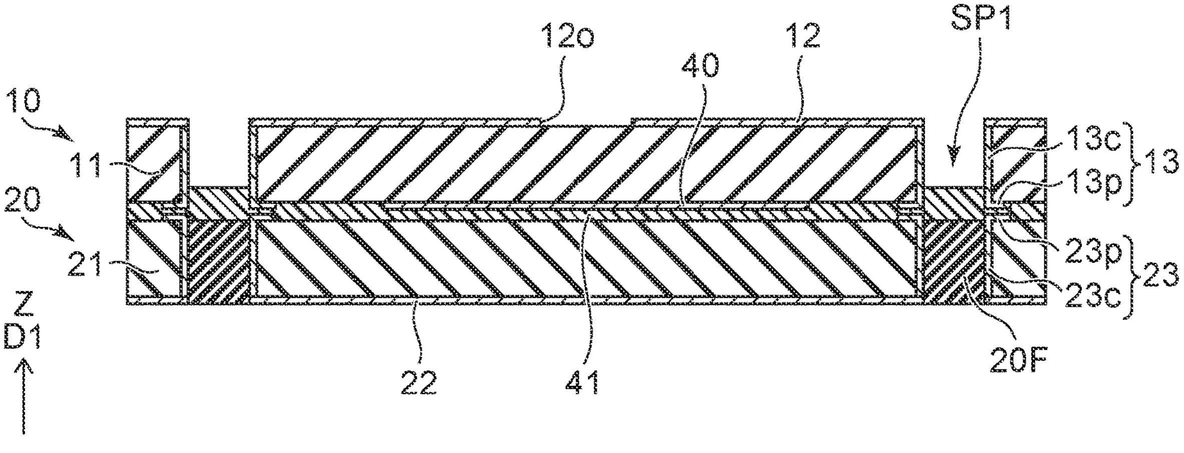
FIG. 7 is a schematic cross-sectional view illustrating the method for manufacturing the antenna device according to the second embodiment.

FIGS. 6 and 7 are schematic cross-sectional views illustrating the method for manufacturing the antenna device according to a second embodiment.

As shown in FIG. 6, the manufacturing method according to the embodiment includes preparing a first structure 10 and a second structure 20.

The first structure 10 includes the first insulating member 11, the first conductive layer 12, and the first connecting conductive member 13. The first connecting conductive member 13 pierces the first insulating member 11 along the first direction D1. The first connecting conductive member 13 includes the first cylindrical portion 13*c* extending in the first direction D1. The first connecting conductive member 13 is electrically connected to the first conductive layer 12.

The second structure 20 includes the second insulating member 21, the second conductive layer 22, and the second connecting conductive member 23. The second connecting conductive member 23 pierces the second insulating member 21 along the first direction D1. The second connecting conductive member 23 is electrically connected to the second conductive layer 22. At least a part of the second insulating member 21 is provided between the second conductive layer 22 and the first conductive layer 12. At least a part of the first insulating member 11 is provided between the second insulating member 21 and the first conductive layer 12. One of the first structure 10 or the second structure 20 includes the signal line 40. The signal line 40 is provided between the second insulating member 21 and the first insulating member 11.

As shown in FIG. 6, the first resin member 41 is supplied between the first structure 10 and the second structure 20.

As shown in FIG. 7, after this, the distance between the first structure 10 and the second structure 20 is reduced, and a part of the first resin member 41 is caused to move into the first space SP1 in the first cylindrical portion 13*c*. In this state, the first structure 10 and the second structure 20 are fixed.

According to the embodiment, the first resin member 41 being thin and uniform can be formed. Formation of voids in the first resin member 41 is suppressed.

The manufacturing method according to the embodiment may further include bonding the first structure 10 and the third structure 30. As shown in FIG. 1, the third structure 30 includes the third insulating member 31 and the third conductive layer 32. The first structure 10 is provided between the second structure 20 and the third structure 30 in the first direction D1. The first gap G1 is provided between the first structure 10 and the third structure 30.

In the embodiment, an electrode can be formed in the first cylindrical portion 13*c* by, for example, forming a hole in the first insulating member 11 and forming a conductive film on the side face of the hole. The holes can be formed by mechanical grinding, laser irradiation, or the like. The conductive film can be formed, for example, by plating. In the embodiments, the conductive layer can be formed by any method.

The embodiments may include the following Technical proposals:

(Technical Proposal 1)

An antenna device, comprising:

a first structure including a first insulating member, a first conductive layer, and a first connecting conductive member, the first connecting conductive member piercing the first insulating member along a first direction, the first connecting conductive member including a first cylindrical portion along the first direction, the first connecting conductive member being electrically connected to the first conductive layer;

a second structure including a second insulating member, a second conductive layer, and a second connecting conductive member, the second connecting conductive member piercing the second insulating member along the first direction, the second connecting conductive member being electrically connected to the second conductive layer, at least a part of the second insulating member being provided between the second conductive layer and the first conductive layer, at least a part of the first insulating member being provided between the second insulating member and the first conductive layer;

a signal line provided between the second insulating member and the first insulating member;

a first resin member including a first resin region and a second resin region, the first resin region being provided between the first structure and the second structure, the second resin region being provided in at least a part of a first space in the first cylindrical portion;

a third structure including a third insulating member and a third conductive layer, the first structure being provided between the second structure and the third structure in the first direction, a first gap being provided between the first structure and the third structure;

a first intermediate member being provided between the first structure and the third structure, and in contact with the first structure and the third structure.

(Technical Proposal 2)

The antenna device according to Technical proposal 1, wherein the first conductive layer includes a slot, and at least a part of the slot is provided between the signal line and the third conductive layer in the first direction.

(Technical Proposal 3)

The antenna device according to Technical proposal 1 or 2, wherein the signal line is fixed to the first insulating member.

(Technical Proposal 4)

The antenna device according to Technical proposal 1 or 2, wherein the signal line is fixed to the second insulating member.

(Technical Proposal 5)

The antenna device according to any one of Technical proposals 1-4, wherein a part of the first resin region is provided between the second connecting conductive member and the first connecting conductive member.

(Technical Proposal 6)

The antenna device according to any one of Technical proposals 1-5, wherein the second connecting conductive member is configured to be capacitively coupled to the first connecting conductive member.

(Technical Proposal 7)

The antenna device according to any one of Technical proposals 1-4, wherein the second connecting conductive member is in contact with the first connecting conductive member.

(Technical Proposal 8)

The antenna device according to any one of Technical proposals 1-7, wherein the first intermediate member bonds the first structure and the third structure.

(Technical Proposal 9)

The antenna device according to any one of Technical proposals 1-8, wherein the first space is connected to the first gap.

(Technical Proposal 10)

The antenna device according to any one of Technical proposals 1-9, wherein the first connecting conductive member further includes a first planar portion, and the first planar portion overlaps the first insulating member in the first direction.

(Technical Proposal 11)

The antenna device according to Technical proposal 10, wherein the first planar portion is provided between the first resin region and the second resin region.

(Technical Proposal 12)

The antenna device according to Technical proposal 10 or 11, wherein the second connecting conductive member includes a second planar portion, the second planar portion overlaps the second insulating member in the first direction, and at least a part of the second planar portion faces the first planar portion.

(Technical Proposal 13)

The antenna device according to any one of Technical proposals 1-11, wherein the second connecting conductive member includes a second planar portion, and the second planar portion overlaps the second insulating member in the first direction.

(Technical Proposal 14)

The antenna device according to any one of Technical proposals 1-13, wherein the second connecting conductive member includes a second cylindrical portion extending along the first direction, the second structure further includes a filling member, and at least a part of the filling member is provided in at least a part of a second space in the second cylindrical portion.

(Technical Proposal 15)

The antenna device according to any one of Technical proposals 1-14, wherein a first distance between the first connecting conductive member and the second connecting conductive member along the first direction is not less than 0.05 μm and not more than 10 μm.

(Technical Proposal 16)

The antenna device according to any one of Technical proposals 1-15, wherein a second distance between the first insulating member and the second insulating member along the first direction is not less than 10 μm and not more than 200 μm.

(Technical Proposal 17)

The antenna device according to any one of Technical proposals 1-16, wherein a third distance between the first insulating member and the third insulating member along the first direction is ½ or less of a wavelength of a radio wave to be transmitted and received.

(Technical Proposal 18)

The antenna device according to Technical proposal 17, wherein a fourth distance between the first conductive layer and the third insulating member along the first direction is less than ½ a wavelength of a radio wave being transmitted and received.

(Technical Proposal 19)

A method for manufacturing an antenna device, the method comprising:

preparing a first structure and a second structure, the first structure including a first insulating member, a first conductive layer, and a first connecting conductive member, the first connecting conductive member piercing the first insulating member in a first direction, the first connecting conductive member including a first cylindrical portion being along the first direction, the first connecting conductive member being electrically connected to the first conductive layer, the second structure including a second insulating member, a second conductive layer, and a second connecting conductive member, the second connecting conductive member piercing the second insulating member along the first direction, the second connecting conductive member being electrically connected to the second conductive layer, at least a part of the second insulating member being provided between the second conductive layer and the first conductive layer, at least a part of the first insulating member being provided between the second insulating member and the first conductive layer, one of the first structure and the second structure including a signal line, the signal line being provided between the second insulating member and the first insulating member; and providing a first resin member between the first structure and the second structure, reducing a distance between the first structure and the second structure, causing a part of the first resin member to move into a first space in the first cylindrical portion, and fixing the first structure and the second structure with each other.

(Technical Proposal 20)

The method for manufacturing the antenna device according to Technical proposal 19, further comprising:

bonding the first structure and a third structure to each other, the third structure including a third insulating member and a third conductive layer, the first structure being provided between the second structure and the third structure in the first direction, a first gap being provided between the first structure and the third structure.

According to the embodiment, it is possible to provide an antenna device whose characteristics can be improved, and a method for manufacturing the same.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in the antenna devices such as insulating members, conductive layers, connecting conductive members, signal lines, resin members, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all antenna devices and methods for manufacturing the same practicable by an appropriate design modification by one skilled in the art based on the antenna devices and the methods for manufacturing the same described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An antenna device, comprising:

a first structure including a first insulating member, a first conductive layer, and a first connecting conductive member, the first connecting conductive member piercing the first insulating member along a first direction, the first connecting conductive member including a first cylindrical portion along the first direction, the first connecting conductive member being electrically connected to the first conductive layer;

a second structure including a second insulating member, a second conductive layer, and a second connecting conductive member, the second connecting conductive member piercing the second insulating member along the first direction, the second connecting conductive member being electrically connected to the second conductive layer, at least a part of the second insulating member being provided between the second conductive layer and the first conductive layer, at least a part of the first insulating member being provided between the second insulating member and the first conductive layer;

a signal line provided between the second insulating member and the first insulating member;

a first resin member including a first resin region and a second resin region, the first resin region being provided between the first structure and the second structure, the second resin region being provided in at least a part of a first space in the first cylindrical portion;

a third structure including a third insulating member and a third conductive layer, the first structure being provided between the second structure and the third structure in the first direction, a first gap being provided between the first structure and the third structure;

a first intermediate member being provided between the first structure and the third structure, and in contact with the first structure and the third structure.

2. The device according to claim 1, wherein the first conductive layer includes a slot, and at least a part of the slot is provided between the signal line and the third conductive layer in the first direction.

3. The device according to claim 1, wherein the signal line is fixed to the first insulating member.

4. The device according to claim 1, wherein the signal line is fixed to the second insulating member.

5. The device according to claim 1, wherein a part of the first resin region is provided between the second connecting conductive member and the first connecting conductive member.

6. The device according to claim 1, wherein the second connecting conductive member is configured to be capacitively coupled to the first connecting conductive member.

7. The device according to claim 1, wherein the second connecting conductive member is in contact with the first connecting conductive member.

8. The device according to claim 1, wherein the first intermediate member bonds the first structure and the third structure.

9. The device according to claim 1, wherein the first space is connected to the first gap.

10. The device according to claim 1, wherein the first connecting conductive member further includes a first planar portion, and the first planar portion overlaps the first insulating member in the first direction.

11. The device according to claim 10, wherein the first planar portion is provided between the first resin region and the second resin region.

12. The device according to claim 10, wherein the second connecting conductive member includes a second planar portion, the second planar portion overlaps the second insulating member in the first direction, and at least a part of the second planar portion faces the first planar portion.

13. The device according to claim 1, wherein the second connecting conductive member includes a second planar portion, and the second planar portion overlaps the second insulating member in the first direction.

14. The device according to claim 1, wherein the second connecting conductive member includes a second cylindrical portion extending along the first direction, the second structure further includes a filling member, and at least a part of the filling member is provided in at least a part of a second space in the second cylindrical portion.

15. The device according to claim 1, wherein a first distance between the first connecting conductive member and the second connecting conductive member along the first direction is not less than 0.05 μm and not more than 10 μm.

16. The device according to claim 1, wherein a second distance between the first insulating member and the second insulating member along the first direction is not less than 10 μm and not more than 200 μm.

17. The device according to claim 1, wherein a third distance between the first insulating member and the third insulating member along the first direction is ½ or less of a wavelength of a radio wave to be transmitted and received.

18. The device according to claim 17, wherein a fourth distance between the first conductive layer and the third insulating member along the first direction is less than ½ a wavelength of a radio wave being transmitted and received.

19. A method for manufacturing an antenna device, the method comprising:

preparing a first structure and a second structure, the first structure including a first insulating member, a first conductive layer, and a first connecting conductive member, the first connecting conductive member piercing the first insulating member in a first direction, the first connecting conductive member including a first cylindrical portion being along the first direction, the first connecting conductive member being electrically connected to the first conductive layer, the second structure including a second insulating member, a second conductive layer, and a second connecting conductive member, the second connecting conductive member piercing the second insulating member along the first direction, the second connecting conductive member being electrically connected to the second conductive layer, at least a part of the second insulating member being provided between the second conductive layer and the first conductive layer, at least a part of the first insulating member being provided between the second insulating member and the first conductive layer, one of the first structure and the second structure including a signal line, the signal line being provided between the second insulating member and the first insulating member; and providing a first resin member between the first structure and the second structure, reducing a distance between the first structure and the second structure, causing a part of the first resin member to move into a first space in the first cylindrical portion, and fixing the first structure and the second structure with each other.

20. The method according to claim 19, further comprising:

bonding the first structure and a third structure to each other, the third structure including a third insulating member and a third conductive layer, the first structure being provided between the second structure and the third structure in the first direction, a first gap being provided between the first structure and the third structure.

* * * * *